United States Patent
Braun

[19]

[11] Patent Number: 6,164,325
[45] Date of Patent: Dec. 26, 2000

[54] FUEL TANK OF A MOTOR VEHICLE AND A LEVEL METERING DEVICE FOR THE FUEL TANK

[75] Inventor: Hans Braun, Stuttgart, Germany

[73] Assignee: Robert Bosch GmbH, Stuttgart, Germany

[21] Appl. No.: 09/341,660

[22] PCT Filed: Jun. 26, 1998

[86] PCT No.: PCT/DE98/01746

§ 371 Date: Jul. 15, 1999

§ 102(e) Date: Jul. 15, 1999

[87] PCT Pub. No.: WO99/30115

PCT Pub. Date: Jun. 17, 1999

[30] Foreign Application Priority Data

Dec. 11, 1997 [DE] Germany ............................ 197 55 056

[51] Int. Cl.[7] .................................................. G01F 23/18
[52] U.S. Cl. ........................... 137/557; 73/299; 123/509; 123/514
[58] Field of Search .................................... 137/557, 486, 137/487; 123/497, 514, 509; 73/299, 300, 301

[56] References Cited

U.S. PATENT DOCUMENTS

| | | | |
|---|---|---|---|
| 4,554,830 | 11/1985 | Khoi .......................................... | 73/299 |
| 4,928,657 | 5/1990 | Asselin ..................................... | 123/497 |
| 5,265,644 | 11/1993 | Tuckey ................................. | 137/557 X |
| 5,661,228 | 8/1997 | Young ..................................... | 73/299 X |
| 6,065,335 | 5/2000 | Denz et al. ........................... | 73/299 X |

FOREIGN PATENT DOCUMENTS 39 14 637 A1  11/1990  Germany .

*Primary Examiner*—Kevin Lee
*Attorney, Agent, or Firm*—Michael J. Striker

[57] ABSTRACT

The level measuring device (12) has a measuring tube (14) that is disposed in the fuel tank (10) and is filled by a partial flow of the fuel delivered to the injection system (44) of the engine (46) of the motor vehicle by a delivery unit (40) disposed in the fuel tank (10). On its one measurement input (26), a differential pressure sensor (24) is acted on by the hydrostatic pressure at the bottom end (30) of the measuring tube (14) and on its other measurement input (28), the sensor is acted on by the hydrostatic pressure at the bottom (16) of the fuel tank (10). When the delivery unit (40) is operating, a fuel column of a known height (lo) is produced in the measuring tube (14), so that the current level (h(t)) of the fuel tank (10) can be determined in an evaluation device (32) based on the output signal (u) of the differential pressure sensor (24). Close to its bottom end (30), the measuring tube (14) has an opening (56), through which the measuring tube (14) can be emptied, when the delivery unit (40) is switched off, to the point that the same level is set in it as in the fuel tank (10) and the offset of the differential pressure sensor (24) can be determined.

8 Claims, 3 Drawing Sheets

FUEL TANK OF A MOTOR VEHICLE AND A LEVEL METERING DEVICE FOR THE FUEL TANK

BACKGROUND OF THE INVENTION

The invention is based on a level measuring device for a fuel tank of a motor vehicle.

A level measuring device of this kind is known from DE 39 14 637 A1. This level measuring device has a measuring tube disposed in the fuel tank, which extends from the bottom of the fuel tank to at least the height of the maximal fill level of the fuel tank and into which the fuel is delivered. The level measuring device also has a differential pressure sensor, whose one measurement input is connected to the lower end of the measuring tube and whose other measurement input is subjected to the fluid pressure at the bottom of the fuel tank. The measuring tube has an overflow opening which is disposed at least at the height of the maximal fill level of the fuel tank. The measuring tube can be emptied by means of an opening disposed close to the bottom of the fuel tank or by means of a valve at the height of the current level of the fuel tank. The level determination takes place in an evaluation device based on the difference of the output signals of the differential pressure sensor when the measuring tube is filled up to the overflow opening and when the measuring tube is emptied to the current level of the fuel tank. The delivery of fuel into the measuring tube takes place by way of a return line, through which fuel not consumed by the internal combustion engine of the motor vehicle is delivered back into the fuel tank. The fuel flowing through the return line is possibly heated so that there is a temperature difference between the fuel in the measuring tube and the fuel in the fuel tank, which in turn results in a difference in the density of the fuel in the measuring tube in comparison to the density of the fuel in the fuel tank, which leads to errors in the output signals of the differential pressure sensor. Furthermore, fuel delivery systems are also known in which there is no return from the engine to the fuel tank so that the known level measuring device cannot be used.

SUMMARY OF THE INVENTION

In accordance with the present invention, the delivery unit is disposed in the fuel tank and delivers fuel from the fuel tank to an injection system of an internal combustion engine of the motor vehicle, and the measuring tube of the level measuring device is filled by means of a partial flow of the fuel delivered by the delivery unit.

The level measuring device according to the invention, which is for a fuel tank of a motor vehicle, has the advantage over the prior art in that the fuel delivered into the measuring tube is not heated and that it is possible to use it in fuel delivery systems without a return.

BRIEF DESCRIPTION OF THE DRAWINGS

Two exemplary embodiment of the level measuring device according to the invention are depicted in the drawings and are explained in more detail in the description below.

DESCRIPTION OF THE PREFERRED EMBODIMENTS

Figure 1:
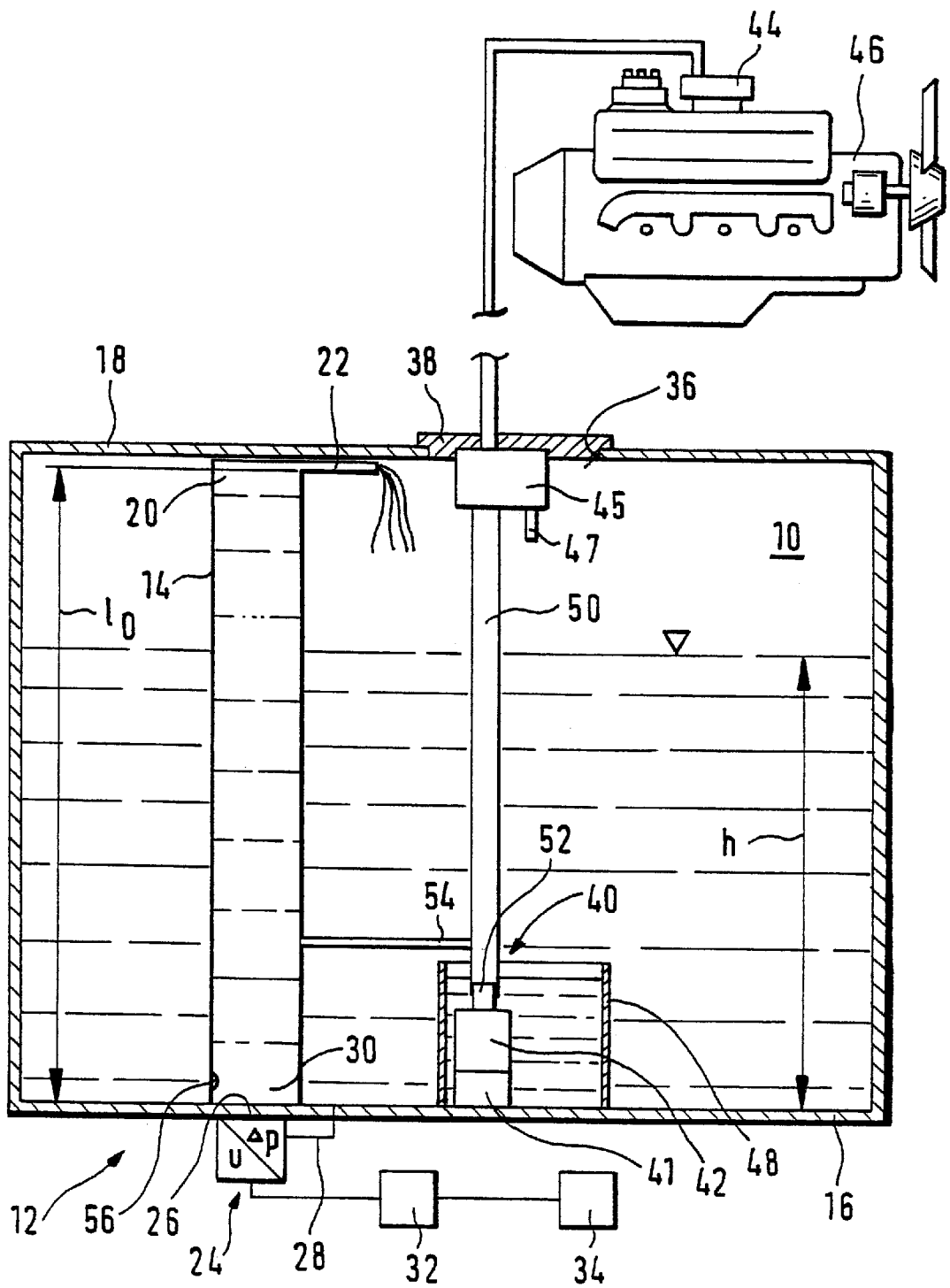
FIG. 1 shows a fuel tank of a motor vehicle with a level measuring device according to a first exemplary embodiment disposed in it, with a filled measuring tube.
Figure 2:
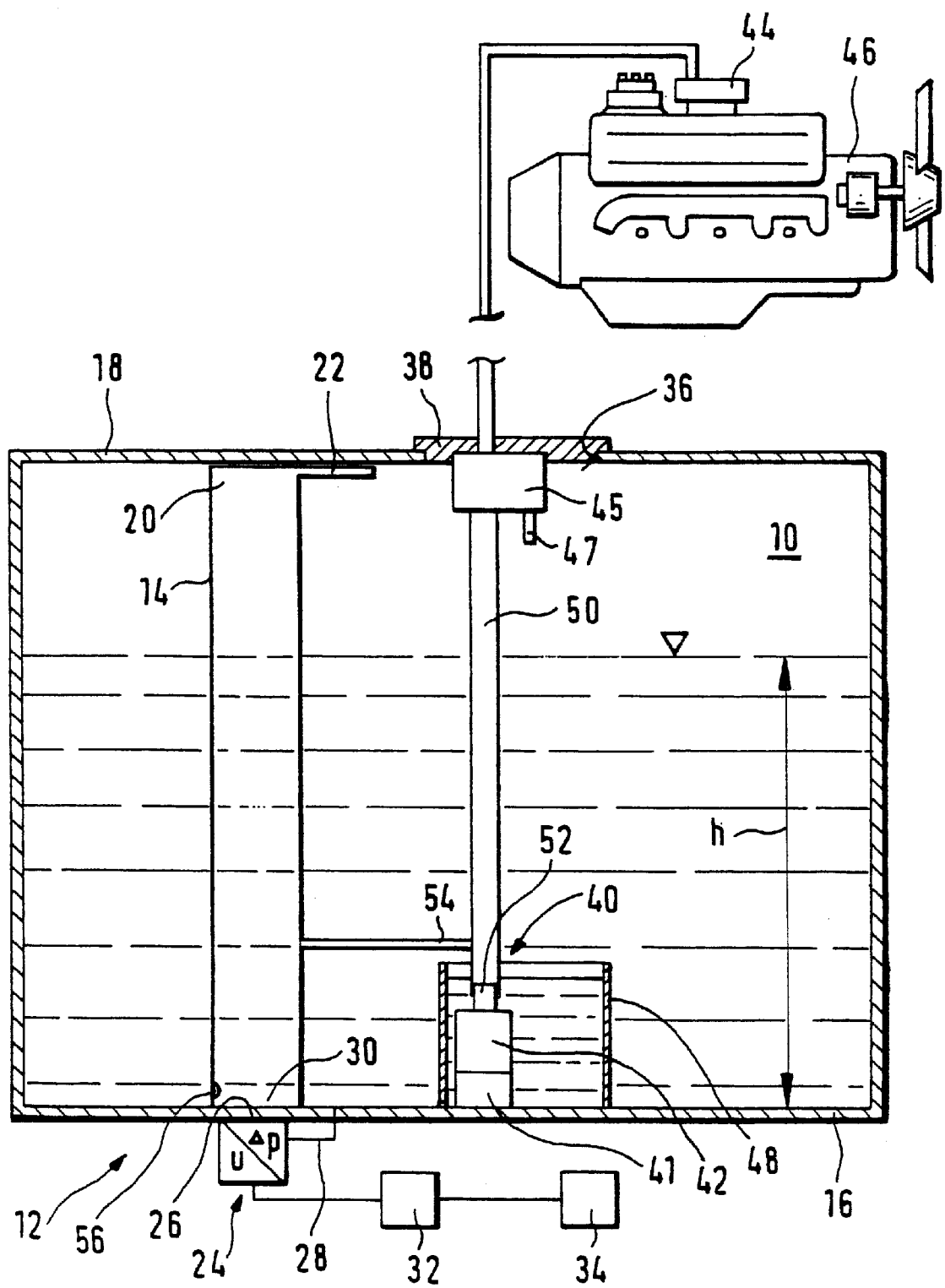
FIG. 2 shows the fuel tank with the level measuring device with an empty measuring tube.
Figure 3:
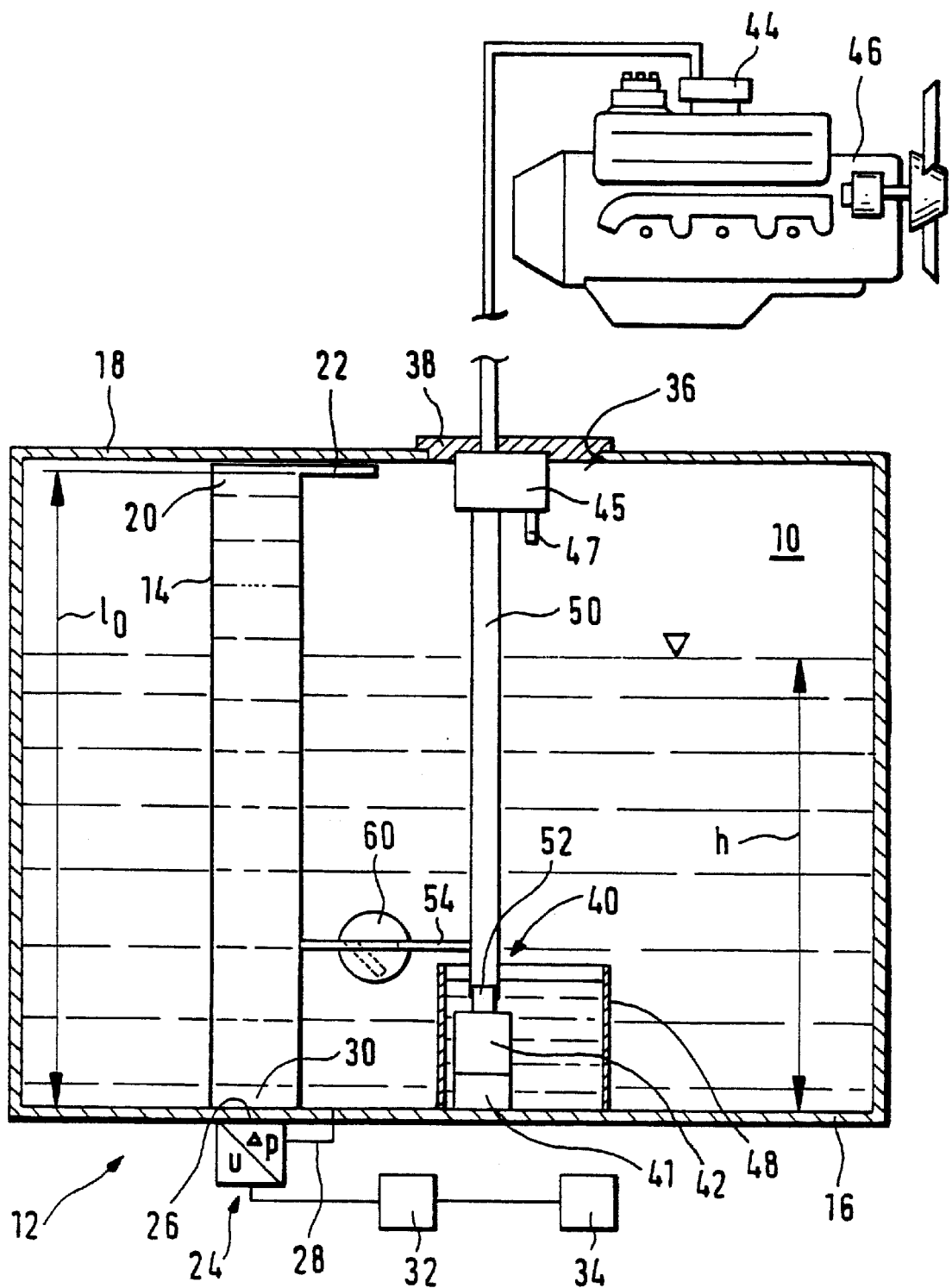
FIG. 3 shows the fuel tank with the level measuring device according to a second exemplary embodiment.

FIGS. 1 to 3 respectively show a fuel tank 10 of a motor vehicle, which can be comprised of metal or plastic. A level measuring device 12 is disposed in the fuel tank 10, which is used to detect the level of the fuel tank 10, which is depicted in a known manner on a indicator instrument 34 in the vehicle driver's field of view. The level measuring device 12 has a vertically extending measuring tube 14 which is disposed in the fuel tank 10 and whose cross section is significantly smaller than the cross section of the fuel tank 10. The measuring tube 14 can, for example, be comprised of plastic or metal and extends from the bottom 16 of the fuel tank 10 to the vicinity of its top 18. Close to its upper end 20, the measuring tube 14 has an overflow opening 22, which feeds into the fuel tank 10.

The level measuring device 12 also has a differential pressure sensor 24 disposed in the fuel tank 10. The differential pressure sensor 24 has two measurement inputs 26, 28, wherein one measurement input 26 is connected to the bottom end 30 of the measuring tube 14 and consequently is acted on by the hydrostatic pressure of the fluid column in the measuring tube 14. The other measurement input 28 of the differential pressure sensor 24 is connected to the bottom 16 of the fuel tank 10 and consequently is acted on by the hydrostatic pressure of the fluid column in the fuel tank 10. The signal output of the differential pressure sensor 24 is connected to an evaluation device 32, which in turn controls the indicator instrument 34. Preferably a micro-mechanical pressure sensor, which is particularly inexpensive, is used as the differential pressure sensor 24.

A delivery unit 40 is disposed in the fuel tank 10 and delivers fuel from the fuel tank 10 to the injection point 44 of an internal combustion engine 46 of the motor vehicle. The delivery unit 40 has a pump part 41 and a drive part 42, which is preferably embodied as an electric motor. The delivery unit 40 is secured in the fuel tank 10 in a manner that is not shown, wherein a cup 48 from which the delivery unit 40 aspirates fuel can be provided in the fuel tank 10. By means of the cup, the assurance is made that even when the fuel tank 10 is at a low level, the delivery unit 40 can deliver a sufficient amount of fuel. Fuel from the fuel tank 10 can be delivered into the cup 48 by means of a jet pump or another pump.

The provision can be made that the delivery unit 40, during operation of the engine 46 does not always operate with the same delivery output, but the operation of the delivery unit 40 is controlled or regulated in such a way that it delivers the fuel quantity consumed by the engine 46 in the current operating state. To this end, the electrical power supplied to the drive part 42 of the delivery unit 40 or the electrical voltage applied to it can be varied. As a result of this demand-controlled operation of the delivery unit 40, a return for fuel not consumed by the engine 46 back into the fuel tank 10 is not required. Alternative to this demand-controlled operation of the delivery unit 40, the provision can also be made that a pressure regulator 45 is disposed in the fuel tank 10, which regulator has an inlet that is connected to the pressure side of the delivery unit 40, an outlet that is connected to the injection system 44 of the engine 46, and a return 47 that feeds into the fuel tank 10. The pressure regulator 45 sets an at least almost constant fuel pressure in the injection system 44. In this embodiment, no return line is required from the engine 46 to the fuel tank 10. The pressure regulator 45 can, for example, be secured together with the delivery unit 40 in the fuel tank 10, or can be secured as shown in FIG. 1 on a cap 38 that closes an opening 36 of the fuel tank 10.

A fuel line 50 leads from the pressure side of the delivery unit 40 to the connection with the injection system 44. Another fuel line 54 branches from the fuel line 50 or directly from the pressure side of the delivery unit 40, for example from a fitting 52 of the delivery unit 40, which fuel line 54 feeds into the measuring tube 14 of the level measuring device 12, close to its bottom end 30. The fuel line 54 feeding into the measuring tube 14 has a significantly smaller cross section than the fuel line 50 leading to the injection system 44. The fuel line 54 feeding into the measuring tube 14 is consequently throttled in comparison to the fuel line 50 leading to the injection system 44 so that a significantly greater fuel quantity is delivered to the injection system 44 by the delivery unit 40 than is delivered into the measuring tube 14.

If the delivery unit 40 is operating, it delivers fuel by way of the fuel line 50 to the injection system 44 and delivers fuel by way of the fuel line 54 into the measuring tube 14. The measuring tube 14 is thus filled with fuel until it is at the height lo of the overflow opening 22, as shown in FIG. 1. With further fuel delivery into the measuring tube 14, the fuel flows by way of the overflow opening 22 back into the fuel tank 10. When the delivery unit 40 is operating, a fuel column with the definite height lo is consequently produced in the measuring tube 14, which produces a definite hydrostatic pressure at the first measurement input 26 of the differential pressure sensor 24. The second measurement input 28 of the differential pressure sensor 24 is subjected to the hydrostatic pressure produced by the fuel column with the height h of the fuel in the fuel tank 10. The current height h of the fuel column in the fuel tank 10 is the level of the fuel tank 10. The output signal u(t) of the differential pressure sensor 24 is thus proportional to the difference between the hydrostatic pressure in the measuring tube 14 and the hydrostatic pressure in the fuel tank 10. The output signal u(t) of the differential pressure sensor 24 is supplied to the evaluation device 32, which determines from it the output signal h(t) according to the following equation:

$$h(t) = lo - (u(t) - uo)$$

In this connection, g is the fall acceleration, ρ is the density of the fuel, k is the transmission factor (sensitivity) of the differential pressure sensor 24, and uo is the output signal of the differential pressure sensor 24 for the state in which the height of the fluid column in the measuring tube 14 is equal to the height h of the fuel in the fuel tank 10. This state is set when the delivery unit 40 is not operating. In this instance, starting from the level of the fuel up to the overflow opening 22 at the height lo, the measuring tube 14 drains down to the current height h of the fuel in the fuel tank, as shown in FIG. 2.

In FIGS. 1 and 2, the level measuring device 12 is represented in accordance with a first exemplary embodiment in which when the delivery unit 40 is switched off, fuel can drain from the measuring tube 14 into the fuel tank 10 through the fuel line 54 and the delivery unit 40. Alternatively, the provision can also be made that the measuring tube 14, close to its bottom end 30, or the fuel line 54 has a small opening 56 through which fuel can drain from the measuring tube 14 into the fuel tank 10. The opening 56 is dimensioned in such a way that by means of it, in a particular unit of time, less fuel can flow out than the delivery unit 40 delivers into the measuring tube 14 when it is operating during this unit of time. Through the connection of the measuring tube 14 to the fuel tank 10 by way of the opening 56 or the delivery unit 40, according to the principle of communicating tubes, the same height h is automatically set in the measuring tube 14 as in the fuel tank 10. The existing output signal uo of the differential pressure sensor 24 in this state represents its offset. This offset is subject to a certain drift during the service life of the differential pressure sensor 24, which would impair the precision of the level measurement. This offset is taken into account in the evaluation device 32 in accordance with the previously indicated equation so that it does not lead to errors in determining the level. The output signal uo of the differential pressure sensor 24 can respectively be determined after the switching off of the delivery unit 40 and can be stored in the evaluation device 32. Consequently, the value stored for the output signal uo can be updated after each time the delivery unit 40 is switched off. The level signal h(t) detected by the evaluation device 32 is continuously indicated on the indicator device, which is not shown.

FIG. 3 shows the level measuring device 12 according to a second exemplary embodiment, wherein the fundamental design is the same as in the first exemplary embodiment. In contrast to the first exemplary embodiment, a valve 60 is disposed in the fuel line 54 between the delivery unit 40 and the measuring tube 14. The valve 60 can be switched between a first position, which is shown with solid lines in FIG. 3, in which it connects the measuring tube 14 to the delivery unit 40 by way of the fuel line 54, and a second position, which is shown with dashed lines in FIG. 3, in which it opens the fuel line 54 and connects the measuring tube 14 to the fuel tank 10. The valve 60 can be embodied as a solenoid valve that can be switched electrically. The switching of the valve 60 between its two positions can be controlled by the evaluation device 32. Normally during operation of the delivery unit 40, the valve 60 is disposed in the position in which the measuring tube 14 is connected to the delivery unit 40 and consequently is filled with fuel up to the height lo so that the current level h of the fuel tank 10 can be determined by means of the differential pressure sensor 24 and the evaluation device 32. At particular time intervals, the valve 60 is switched into its other position in order to connect the measuring tube 14 to the fuel tank 10, to permit a detection of the output signal uo of the differential pressure sensor 24, and consequently to compensate for the zero point drift. This switching of the valve 60 can take place not only when the engine 46 is shut off and the delivery unit 40 is switched off, but also during operation of the delivery unit 40.

Alternatively, the valve 60 can also be embodied in such a way that in its one position, the fuel line 54 is open and in its other position, the fuel line 54 is closed. In this instance, as in the first exemplary embodiment, an opening 14 is provided in the fuel line 54 between the valve 60 and the measuring tube 14 or in the vicinity of the bottom end 30 of the measuring tube 14, in order to permit the measuring tube 14 to be emptied.

What is claimed is:

1. A fuel tank system of a motor vehicle, comprising a fuel tank having a bottom; and a level measuring device with a measuring tube (14) disposed in the fuel tank (10), which extends from the bottom (16) of the fuel tank (10) at least to the maximal fill level of the fuel tank (10), with a differential pressure sensor (24) having a measurement input (26) that is connected to the bottom end (30) of the measuring tube (14) and having another measurement input (28) that is subjected to the fluid pressure at the bottom (16) of the fuel tank (10) outside the measuring tube (14), wherein fuel is delivered into the measuring tube (14) and the measuring tube (14) has an overflow opening (22) disposed at least at the height of the maximal fill level of the fuel tank (10), wherein the measuring tube (14) can be emptied down to the current level of the fuel tank (10) and wherein a level determination takes place in an evaluation device (32) based on the difference between the output signals of the differential pressure sensor (24) when the measuring tube (14) is filled with fuel up to the overflow opening (22) and when the measuring tube (14) is emptied down to the current level of the fuel tank (10), wherein a delivery unit (40) is disposed in the fuel tank (10) and delivers fuel from the fuel tank (10) to an injection system (44) of an internal combustion engine (46) of the motor vehicle, and the measuring tube (14) is filled by means of a partial flow of the fuel delivered by the delivery unit (40).

2. The fuel tank according to claim 1, wherein the delivery unit (40) feeds fuel into the measuring tube (14) by way of a connection (54) that is throttled.

3. The fuel tank according to claim 1, wherein the delivery unit (40) feeds fuel into the measuring tube (14) close to the bottom end (30).

4. The fuel tank according to claim 1 wherein the emptying of the measuring tube (14) down to the current level of the fuel tank (10) occurs through drainage of fuel from the measuring tube (14) into the fuel tank (10) by means of the delivery unit (40).

5. The fuel tank according to claim 1 wherein a valve (60) is disposed in a connection (54) between the delivery unit (40) and the measuring tube (14) and can be switched between a position in which the measuring tube (14) is connected to the delivery unit (40) by way of the connection (54) and a position in which the measuring tube (14) is connected to the fuel tank (10).

6. The fuel tank according to claim 1 wherein a valve (60) is disposed in a connection (54) between the delivery unit (40) and the measuring tube (14) and can be switched between a position in which the measuring tube (14) is connected to the delivery unit (40) by way of the connection (54) and a position in which the connection (54) is closed.

7. The fuel tank according to claim 1 wherein the fuel quantity delivered by the delivery unit (40) can be changed as a function of the current fuel quantity demand of the engine (46) of the motor vehicle.

8. The fuel tank according to claim 1 wherein a pressure regulator (45) is disposed in the fuel tank (10), which regulator has an inlet connected to the pressure side of the delivery unit (40), an outlet connected to the injection system (44) of the engine (46) of the motor vehicle, and a return that feeds into the fuel tank (10).

* * * * *